W. D. MOUNT.
FILTER.
APPLICATION FILED DEC. 11, 1919.
1,348,036.
Patented July 27, 1920.
3 SHEETS—SHEET 1.
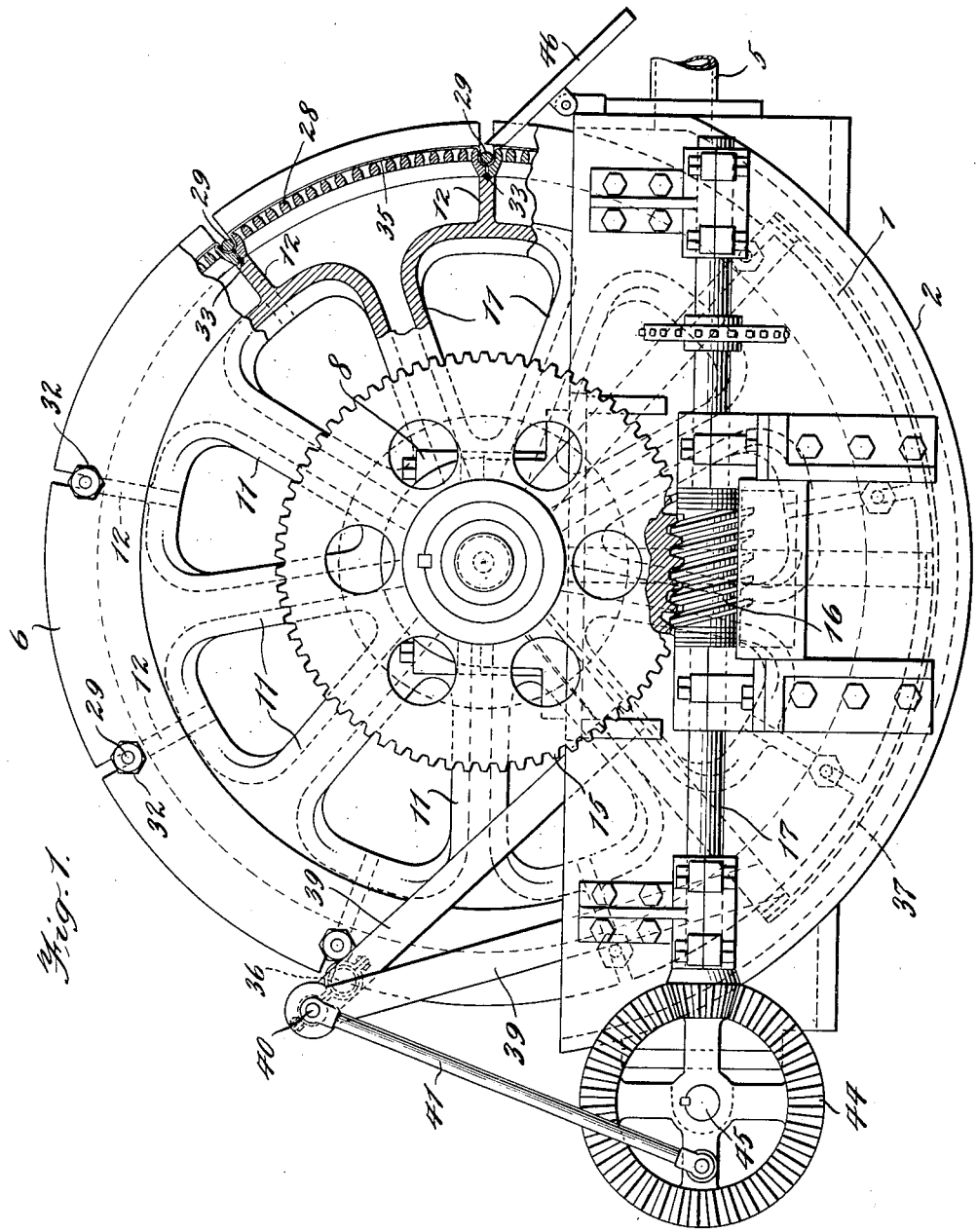
WITNESS:
INVENTOR.
William D. Mount
BY
Rosenbaum Stockbridge & Borst
ATTORNEYS.

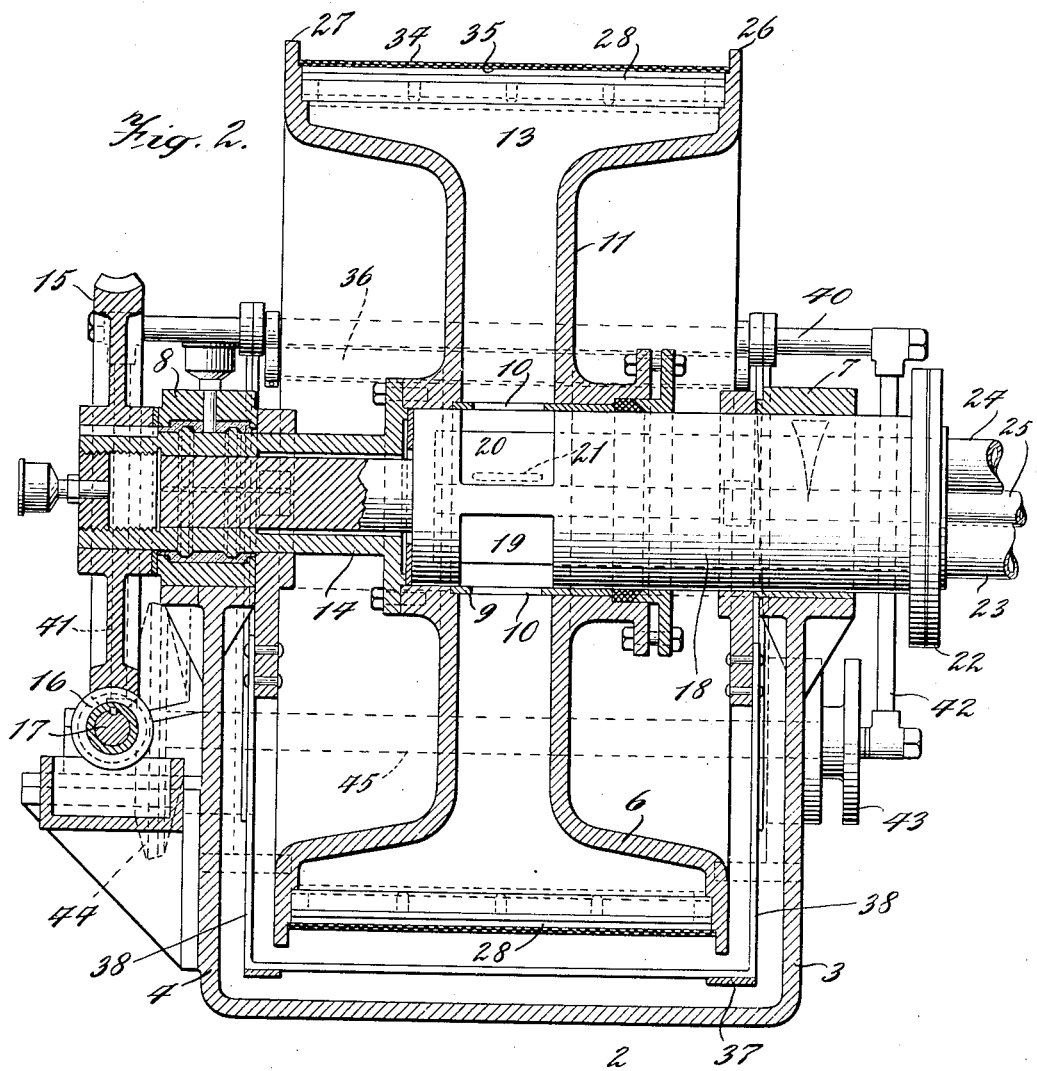

W. D. MOUNT.
FILTER.
APPLICATION FILED DEC. 11, 1919.
1,348,036.
Patented July 27, 1920.
3 SHEETS—SHEET 3.
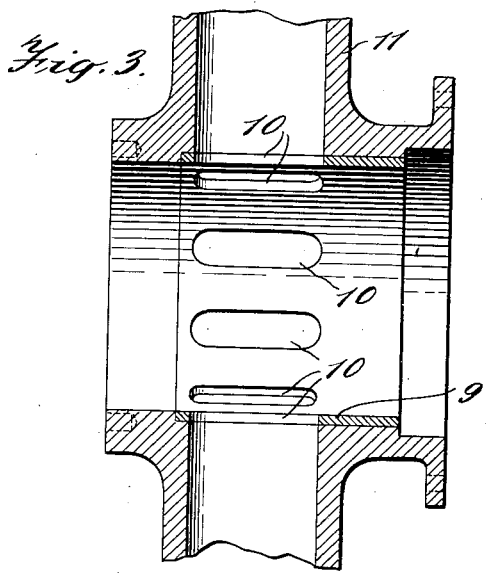
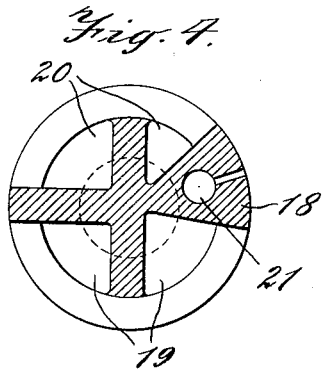
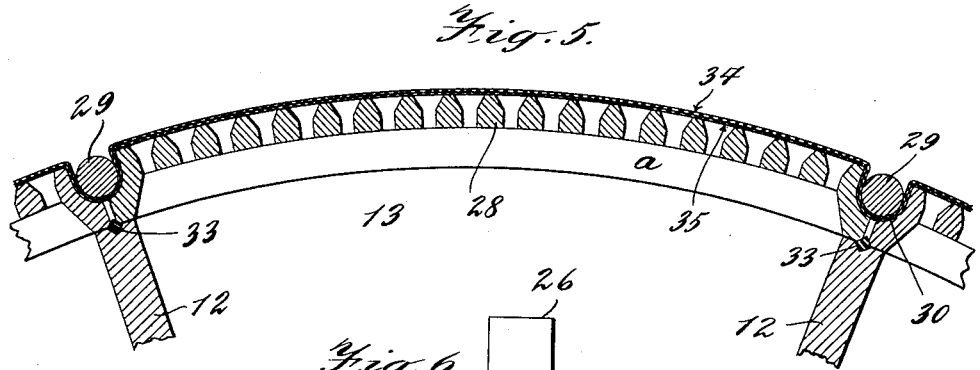
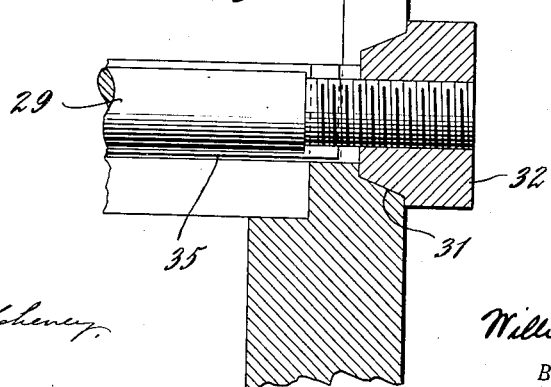
WITNESS:
INVENTOR.
William D. Mount
BY
Rosenbaum Stockbridge & Borst
ATTORNEYS.

UNITED STATES PATENT OFFICE.

WILLIAM D. MOUNT, OF LYNCHBURG, VIRGINIA.

FILTER.

1,348,036.

Specification of Letters Patent.

Patented July 27, 1920.

Application filed December 11, 1919. Serial No. 344,227.

*To all whom it may concern:*

Be it known that I, WILLIAM D. MOUNT, a citizen of the United States, residing at Lynchburg, in the county of Campbell and State of Virginia, have invented certain new and useful Improvements in Filters, of which the following is a full, clear. and exact description.

This invention relates to filters and has special reference to rotary suction filters of that type which are used to separate the solid and liquid contents of sludge or mud from caustic, bicarbonate of soda, salt kaolin and other solutions.

The object of the invention is to provide a filter for these and other purposes which shall be simple in construction and efficient in action being particularly adapted for continuous operation.

In the accompanying drawings—

Figure 1 is an end elevation of my improved filter;

Fig. 2 is a vertical section thereof in the plane of the shaft;

Fig. 3 is a section of the hub portion of the filter drum;

Fig. 4 is a transverse section of the inner end of the stationary shaft;

Fig. 5 is an enlarged sectional detail of a part of the drum periphery and

Fig. 6 is a detail of the stretcher rod fastening.

The general features of the filter include a trough into which the material to be filtered is delivered, the trough having an arcuate bottom and vertical parallel sides; a rotary drum, the lower portion of which dips into or occupies the trough and which is divided into a plurality of compartments each opening through a filtering diaphragm at the periphery of the drum and communicating with passages or chambers in a stationary shaft by suitable ports which are controlled by the rotation of the drum to properly lead off the filtrate and other fluids used in the operation of the filter.

The trough is indicated as a whole by 1, its arcuate bottom by 2 and its two vertical sides by 3 and 4. It is provided with an inlet at 5 for the "mud" or material to be filtered which may flow continuously or in charges. The drum, indicated generally by 6, is supported on an axis transverse to the trough and concentric with bearing 8 and support 7 resting upon the upper edges and at the middle of the side walls of the trough. The hub of the drum shown in detail in Fig. 3, is hollow and provided with a ported bronze bushing 9, the ports 10 of which communicate with hollow spokes 11 whose passages lead to peripheral compartments 13 in the drum which are separated from each other by short radial partitions 12 midway between each two spokes. To the left side of the hub of the drum (Fig. 2) is bolted a sleeve 14, of less diameter than the hub, which affords a journal for the drum occupying the bearing 8 and projecting beyond the same to carry a driving worm gear 15. Gear 15 is driven through worm 16 by drive shaft 17. A second bearing for the drum is afforded by a stationary shaft or axle 18 which has a portion of large diameter fitting in the hub of the drum and projecting to the right (Fig. 2) into the support 7 on the trough in which it is fixed, and a portion of smaller diameter which extends through the sleeve 14 and upon which the latter turns. The larger portion of axle 18 is provided with three longitudinal passages 19, 20 and 21 respectively, their inner ends being extended laterally to the surface of the axle to communicate with ports 10 in the hub of the drum while their outer ends communicate through a coupling plate 22 with three pipes 23, 24 and 25, respectively. The inner lateral end of the passage 19 spreads around the lower face of the axle slightly less than 180° so as to be in communication through the ports 10 with all of the compartments in the lower half of the drum simultaneously. The lateral end of passage 20 is likewise widened to be in communication with the compartments in the upper half of the drum simultaneously, while the lateral end of the passage 21 is restricted and in the form of a narrow slit and communicates with only one compartment at a time. Passage 19 is an exhaust passage through which the filtrate is drawn by suction, whence it is led off through pipe 23. Passage 20 carries off wash water to pipe 24 and passage 21 receives compressed air from pipe 25 and delivers it in puffs successively to the compartments to remove the cake deposited against the exterior of the periphery of the drum while passing through the trough.

The periphery of the drum is a cylindrical surface slightly below the edges of two annular flanges 26 and 27. The surface is composed of a series of grids 28 all alike as to size and shape and interchangeable and each grid constituting the outer or peripheral wall of a compartment 13. The grids are rectangular in outline and their abutting edges come together at and rest upon the outer edges of the radial partitions 12 between the compartments. In this position they are removably held in place by stretcher rods 29, one at each joint which rest in seats 30 formed partly in one grid and partly in the other, the extremities of the rods being threaded and passing into and through slots formed in the flanges 26 and 27. At the base of these slots are conical countersinks 31 to receive conical nuts 32 on the ends of the rods. These countersinks are so located that when the nuts are set into the countersinks the rods are drawn bodily toward the axis of the drum and against the seats in the grids thus holding the latter firmly against the partitions 12. To prevent the escape of liquid from one compartment to another through this joint, a packing strip 33 is confined in a passage formed between the grids and the partition.

The filtering diaphragm or medium is sustained by the grid against internal suction and external pressure; it may consist of one or two metallic filter cloths or screens as 34 and 35 stretched over the outer faces of the grids and having two of their opposite edges confined beneath the stretcher rods 29 which are thereby stretched and clamped in place when the rods are adjusted to secure the grids.

A water pipe having sprinkler outlets is located across the face of the drum at 36 and is adapted to be connected with a source of water supply. Its purpose is to spray the cake immediately after it has been deposited against the grids while passing through the trough.

For agitating the material in the trough there is provided a frame 37, suspended by arms 38 concentrically with the axis of the drum. Extensions 39 from the frame are connected together outside of the periphery of the drum by a cross-rod 40, to the ends of which are attached rods 41 and 42 leading to crank-pins on a disk 43 and a gear wheel 44 mounted upon the shaft 45 and driven by pinion from the main shaft 17. By means of these connections the cross-rod 40 is moved up and down and the frame is swung back and forth through the mass in the trough. A blade 46 is arranged to lift the deposited cake from the surface of the drum and direct it to a suitable receptacle.

The operation of the filter is as follows: Suction is applied to pipe 23 and air pressure to pipe 25. The drum turns clockwise as viewed in Fig. 1. The lower portion of the drum being submerged in the material in the trough, the material is drawn against the filter cloth, the liquid passing through the cloth and into the compartments and the solids which cannot pass the mesh of the cloth, adhering in a cake or layer against the outside thereof. The filtrate liquor is drawn through the passage 19 in the stationary shaft and is led off to a suitable depository by pipe 23. The cake is carried around by the drum and as it passes the water pipe 36 it is sprayed to wash out any sediment of an undesirable material that may be held in the cake. This wash water passes to a considerable extent through the cake and filter cloth into the compartments and flows thence through the ports 10 and passage 20 in the stationary shaft to outlet pipe 24. Immediately before the compartments again enter the trough, their ports 10 uncover the restricted end of passage 21 and a puff of air therefrom serves to loosen the cake from the filter cloth so that the scraper 46 can easily remove it.

The filter is continuously acting, it does not clog, the separation of the solids and liquids is complete and the final product is clean.

The provision of the stationary shaft with its passages leading from the compartments of the filter to the outside, is a feature of importance in that it dispenses with the jointed pipes commonly used heretofore, the threaded connections of which soon become leaky from the attack of strong acids or alkalis passed through the machine.

I claim:

1. A filter comprising a rotary drum having two peripheral flanges and a series of successively arranged interchangeable grids mounted between said flanges and constituting the peripheral surface of the drum and a single clamping device for simultaneously securing the two abutting edges of adjoining grids to the drums.

2. A filter comprising a rotary drum having two peripheral flanges and a series of successively arranged interchangeable grids mounted between said flanges and constituting the peripheral surface of the drum, said grids having complementary half seats on their adjoining edges, and securing bolts extending along said seats and engaging the flanges on the drum.

3. A filter comprising a rotary drum, a series of successively arranged interchangeable grids forming the peripheral surface of the drum and having seats formed therein at their abutting edges, a filtering diaphragm stretched against the exterior faces of said grids and entering said seats and a securing rod bearing against the diaphragm in each seat and engaging the drum to thereby hold the diaphragm and grids in place.

4. A filter comprising a rotary drum having two peripheral flanges and a series of successively arranged interchangeable grids mounted between said flanges and constituting the peripheral surface of the drum, said grids having complementary half seats on their abutting edges, the flanges being provided with radial notches in line with the abutting edges of the grids, the notches having beveled countersunk seats and stretcher rods extending along the seats between the grids and through the respective notches in the flanges and having conical nuts adapted to engage the countersunk seats to draw the rods to a firm bearing against the grids.

5. A filter comprising a rotary drum having two peripheral flanges and a series of successively arranged interchangeable grids mounted between said flanges and constituting the peripheral surface of the drum, and a single clamping device for simultaneously securing the two abutting edges of adjoining grids to the drums, said clamping devices engaging the peripheral flanges.

6. A filter comprising a rotary drum having two peripheral flanges and a series of successively arranged interchangeable grids mounted between said flanges and constituting the peripheral surface of the drum, the flanges being provided with notches in line with the abutting edges of the grids, the notches having beveled countersunk seats, and stretcher rods engaging the grids and extending through the respective notches in the flanges and having conical nuts adapted to engage the countersunk seats to draw the rods to a firm bearing against the grids.

In witness whereof, I hereunto subscribe my signature.

WILLIAM D. MOUNT.